United States Patent
Fischbeck et al.

(10) Patent No.: US 7,224,375 B2
(45) Date of Patent: May 29, 2007

(54) METHOD AND DEVICE FOR NOISE REDUCTION IN A PULSE-WIDTH CONTROLLED IMAGE DISPLAY DEVICE

(75) Inventors: Udo Fischbeck, Fürth (DE); Johannes Spindler, Nürnberg (DE)

(73) Assignee: Grundig Multimedia B.V., Amsterdam (NL)

( * ) Notice: Subject to any disclaimer, the term of this patent is extended or adjusted under 35 U.S.C. 154(b) by 393 days.

(21) Appl. No.: 10/483,615

(22) PCT Filed: Jul. 30, 2002

(86) PCT No.: PCT/EP02/08440

§ 371 (c)(1),
(2), (4) Date: Jan. 12, 2004

(87) PCT Pub. No.: WO03/015065

PCT Pub. Date: Feb. 20, 2003

(65) Prior Publication Data

US 2004/0160459 A1 Aug. 19, 2004

(30) Foreign Application Priority Data

Aug. 4, 2001 (DE) ................................ 101 38 353

(51) Int. Cl.
*G09G 5/10* (2006.01)

(52) U.S. Cl. .................... 345/692; 345/36; 345/76; 345/207

(58) Field of Classification Search ................ 348/692, 348/36, 76, 207
See application file for complete search history.

(56) References Cited

U.S. PATENT DOCUMENTS

| 4,573,075 | A | | 2/1986 | Bolger |
| 4,682,230 | A | * | 7/1987 | Perlman et al. ............. 348/616 |
| 6,091,389 | A | | 7/2000 | Maeda et al. |
| 7,006,708 | B1 | * | 2/2006 | Nako et al. ................. 382/294 |

FOREIGN PATENT DOCUMENTS

| EP | 0 629 083 A1 | | 12/1994 |
| EP | 0 720 139 A2 | | 7/1996 |
| JP | 10-091120 | | 4/1998 |
| JP | 10-091120 | * | 10/1998 |

OTHER PUBLICATIONS

IBM Technical Disclosure Bulletin, Temporal-Based Dithering for Reducing Perceived Quantization Error In Video Displays, vol. 38 No. 09. Sep. 1995, pp. 61-63.

* cited by examiner

*Primary Examiner*—Richard Hjerpe
*Assistant Examiner*—Leonid Shapiro
(74) *Attorney, Agent, or Firm*—Quarles & Brady LLP

(57) ABSTRACT

The invention relates to a method and a device for noise reduction in a pulse-width controlled image display device. A monitoring of whether the brightness of several sequential image points is brighter than a given brightness threshold value occurs. If not the case, the delayed but otherwise unchanged input signal is supplied to the display. If, on the other hand, the brightness of several sequential image points is less than the given threshold brightness value, a mean value generation for the brightness values of several sequential image points occurs and said mean value is supplied to the display.

3 Claims, 2 Drawing Sheets

METHOD AND DEVICE FOR NOISE REDUCTION IN A PULSE-WIDTH CONTROLLED IMAGE DISPLAY DEVICE

BACKGROUND OF THE INVENTION

The invention concerns a method and a device for noise reduction in a pulse-width-controlled image-display device.

For example, such a method and such a device are used in plasma displays, which will complement or replace the color tubes still used in high-quality television equipment at the present time. In connection with color tubes, the user of high-quality television equipment has been accustomed to flicker-free reproduction since the end of the 80s due to the 100 Hz technology.

A plasma display is known from the journal, Radio Fernsehen Elektronik RFE, No. 2, 1997, pages 18–20, which consists of two glass plates with electrodes arranged in a matrix, between which a noble gas mixture is located. The image information in plasma displays is not represented by lines, as in the case of the cathode-ray tubes, but as a whole image. Since, in a plasma display, the individual image points cannot be turned on and off individually at arbitrary times, the activation of the image point must occur in an activation pass for the entire display.

The start-up of a plasma display occurs in several phases: an addressing- or initialization phase, a holding- or activation phase and a turn-off phase.

In the addressing- or initialization phase, all cells of the plasma display which are to be activated in the subsequent holding- or activation phase are precharged. In the last step, the turn-off phase, the precharged cells are discharged and the image information is turned off.

The time interval available for the representation of a TV image is divided into time intervals of different duration or different weighting, while a predetermined activation sequence is chosen as a function of the brightness of a particular image point. This corresponds to lighting up of the particular image point once or several times during the image presentation in the available time interval, where a predetermined time duration is assigned to each lighting up process.

Such known plasma displays are sold on the market, for example, by the companies Fujitsu and NEC.

From DE 198 33 597 A1, a method and a device are known for reduction of flicker in pulse-width-controlled image-display devices, especially in a color plasma display. Such a color plasma display serves, for example, for the representation of TV images. The color plasma display is controlled with a pulse-width modulator, whereas, for triggering, the duration of a TV image is divided into a number of partial images or partial time intervals, which are shown sequentially. In order to reduce flicker, especially to reduce a 50 Hz flicker, the sequence of the partial time intervals and/or activation sequences of the partial time intervals is predetermined so that the flickering of the images to be presented is minimum.

Furthermore, a motion-detector-dependent change of the sequence of time intervals is known. When motion is present, the sequence of time intervals is chosen so that motion artifacts are avoided. Otherwise the sequence of the time intervals is such that 50 Hz flicker disturbances are reduced.

Furthermore, it is already known in connection with plasma displays that one can determine the brightness of an image to be represented, derive a maximum permissible illumination duration for each partial time interval of the image to be represented from the determined brightness value and change the maximum permissible illumination duration for each of the partial time intervals in case of change of the detected brightness value. This change is done in such a way that, at a determined dark image content or low brightness value, the maximum permissible illumination duration is increased in each of the partial time intervals by the same time duration. However, on the other hand, if it is found that, in the brightness determination of the image to be represented, an overall bright image content is present, then the maximum permissible illumination duration of each partial time interval is reduced by a duration which is the same for all partial time intervals.

A disadvantage of this procedure consists in the fact that the contrast of the image to be produced is reduced, because, if the brightness of the image to be represented is high, the time duration for the representation of bright image components is reduced, and, if the brightness of the image to be represented is low, dark gray image components are represented as light gray, because these are pulled up, that is, are lit up longer as a result of the application of a constant offset described above.

Furthermore, a method is known from German Patent Application 100 09 858 for improving the contrast of a pulse-width-controlled image display device. In this method, a change of the maximum permissible illumination duration for the partial time intervals is carried out in such a way that the maximum permissible illumination duration is subjected to smaller changes for partial time intervals with lower value than the maximum permissible illumination duration for partial time intervals with a higher value.

SUMMARY OF THE INVENTION

Starting from this state of the art, the task of the invention is to provide a new method and a new device in which noise is reduced.

The advantages of the invention consist in the fact that noise is reduced in the dark areas of a displayed image. Thus, the circumstance is taken into consideration that, in the case of pulse-width-controlled image-display devices, especially in plasma displays, the noise that occurs in the dark areas of the image is especially disturbing. This to be attributed to the fact that short partial time intervals are assigned to dark image areas. For example, when, due to the noise, not only the partial time interval is activated which is assigned to the LSB of a multibit word, but also the neighboring partial time interval LSB+1, then this means already a doubling of the brightness, which is reported by the human eye and is found disturbing.

This applies especially when, in order to obtain artificial increase of the number of gray stages in the sense of a "dithering process", both LSB as well as LSB+1 are divided into four neighboring pixels of the image to be shown. In this case, any noise present causes additional spatial effects in the abovementioned four-block, which appears disturbing to the human eye.

With the aid of the claimed replacement of image points with low brightness values with average brightness values, the noise that occurs in the dark areas of the image is reduced. In the bright areas of the image, no change of the image signal occurs, since the noise in the bright areas of the image appears to be less disturbing.

The claimed method can be used both in the sense of a one-dimensional filtering as well as of a two-dimensional and even three-dimensional filtering. In the case of two-dimensional filtering, only additional line memories, and in case of three-dimensional filtering, image memories are additionally provided.

Optionally, the filtering that was performed can extend to image points which lie in the transition region between filtered and unfiltered data. As a result of this, the transitions are made softer.

Furthermore, the number of sequential image points, which are checked in the first step, can be chosen to be of different size. This also applies to the number of image points which are used to form the mean value. Naturally, in these cases, the delay time of the delay member lying in the path of the unfiltered signal must be adjusted appropriately.

BRIEF DESCRIPTION OF THE DRAWINGS

Further advantageous properties of the invention follow from the explanation of a practical example with the aid of figures. The following are shown.

DETAILED DESCRIPTION

Figure 1:
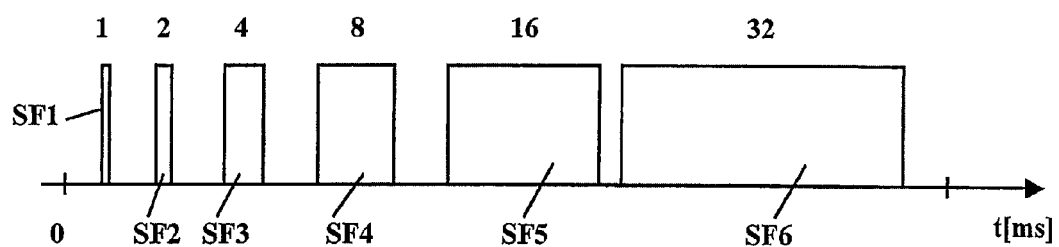
FIG. 1 is a sketch explaining the triggering of a pulse-width-controlled image-display device.

FIG. 1 shows a sketch which explains the triggering of a pulse-width-controlled image-display device, for example, of a plasma display. The time interval of 20 milliseconds available for the representation of a TV image is divided into partial time intervals SF1, SF2, . . . , SF6. Each of these partial time intervals has a different duration or weighting G, which are shown in FIG. 1, always above the little boxes representing the partial time intervals. During these partial time intervals, depending on the brightness value of a particular image point, a predetermined activation sequence is selected. This corresponds to lighting up the image point once or several times during the time interval available for representing the image, and a predetermined time duration is assigned to each lighting up.

For example, in the case of dark image points, only one lighting up occurs during the partial time interval SF1, which corresponds to the LSB of a video signal. If, due to noise, lighting up of SF2 also occurs during the partial time interval, which, in comparison to SF1, has a length which is approximately twice as long or weighted double, then this means an almost doubling of the brightness, which is detected by the human eye as disturbing.

Figure 2:
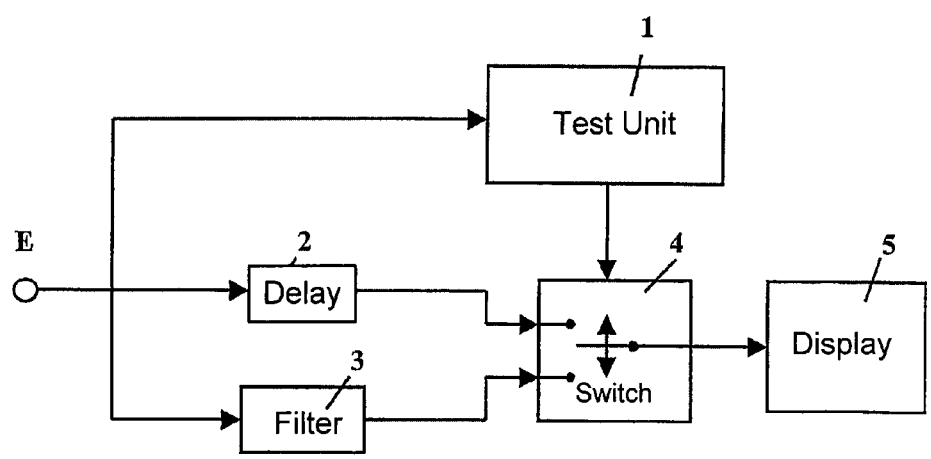
FIG. 2 is a block diagram explaining the practical example of the invention.

In order to avoid such disturbances caused by noise, which occur above all in dark areas of the image, a signal processing is performed as it is described in FIG. 2 with the aid of a practical example of the invention.

FIG. 2 shows a block diagram to explain a practical example of the invention. A video signal in the form of a signal data stream is introduced to input E, which corresponds to the brightness signals of sequential image points of the image to be displayed on the plasma display. This video input signal is divided into three signal paths.

In the upper signal path, it arrives to a test unit 1, which checks if the brightness of three sequential image points is always smaller than a predetermined brightness threshold value. If this is not the case, then test unit 1 generates a control signal for a switch 4 through which switch 4 is brought into its upper switching position. On the other hand, if the brightness of three sequential image points is smaller than the predetermined brightness threshold value, then the test unit 1 produces a control signal for switch 4 through which switch 4 is brought into its lower switching position.

In the middle signal path, a delay member 2 is provided in which the input data stream is slowed down by the duration of two image points. The output signal of the delay member 2 is introduced to the upper input of switch 4.

In the lower signal path, the input signal is passed through a filter 3, in which a linear or weighted mean value formation of three sequential image points occurs. The output signal of filter 3 is introduced to the lower input of switch 4.

The output of switch 4 is connected to a plasma display 5, where the signal representation occurs.

When the brightness of three sequential image points are all below the brightness threshold value, then, in the circuit shown, the lower signal path is switched so that a mean signal is introduced to display 5 and then, when the brightness of three sequential image points does not lie below the brightness threshold value, the middle signal path is switched, so that the delayed but otherwise unchanged input signal is further conducted to display 5.

The test described above and the signal processing performed as a function of the test result, is repeated from image point to image point.

FIG. 3 shows a time diagram in which the functioning of the invention is illustrated. In FIG. 3a, the signal data stream present at the input E is shown, where the brightness values of the sequential image points are given in the hexadecimal form. This signal data stream is subdivided into three regions B1, B2, B3 for illustration, where the brightness values of the image points in regions B1 and B3 are greater than the predetermined brightness threshold value, which, in the present practical example, is at 30 in the hexadecimal representation and where the brightness values of the image points in area B2 are smaller than the abovementioned brightness threshold value.

Figure 3A:
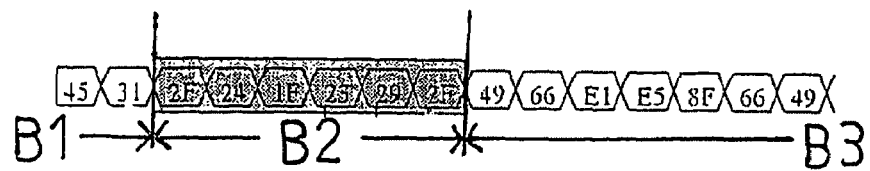
FIG. 3 is a time diagram to illustrate the mode of functioning of the invention.
Figure 3B:
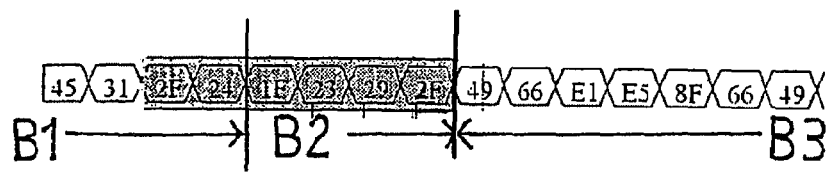

FIG. 3b shows the signal data stream present at the outlet of the delay member 2, which is delayed in comparison to the input signal data stream by the duration of two image points.

Figure 3C:
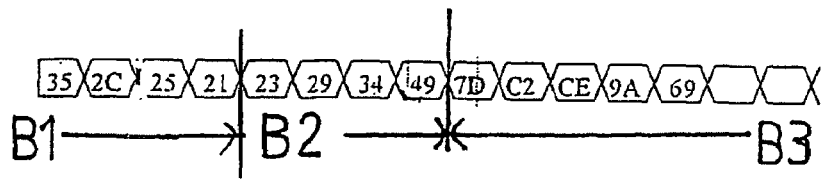
Figure 3D:
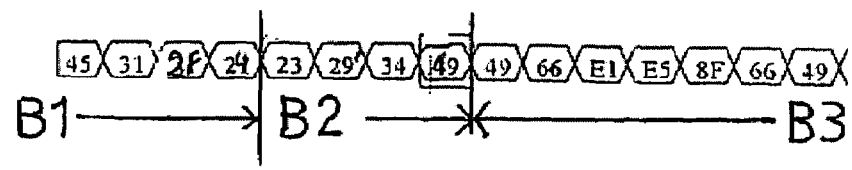

FIG. 3c shows the delayed, filtered data stream, as it is present at the output of filter 3 and FIG. 3d shows the data stream present at the output of switch 4. It can be seen from the latter that the brightness values in the regions B1 and B3, apart from the delay by the duration of two image points, agree with the corresponding brightness values of the input data stream. The brightness values in region B2 are, on the other hand, replaced according to the present invention by mean values, which were determined by the brightness values of three sequential image points.

By forming this mean value, which is performed only in the dark areas of the image, the noise in these dark image areas is reduced.

The invention claimed is:

1. Method for noise reduction in a pulse-width-controlled image-display device, wherein the time interval available for representing the image is divided into sequential weighted partial time intervals, which form a signal data stream, and wherein the brightness signals present in the form of multibit words belonging to the image points of the image to be represented, are produced by changing to activation sequences assigned to the partial time intervals, the method further comprising:

a) in a first step, the brightness of several sequential image points is examined to determine if said brightness is greater than a predetermined brightness threshold value, b) in a second step then,
   when the brightness values of several sequential image points are all smaller than the predetermined brightness threshold value, a mean value of the brightness value is formed from these brightness values for the several sequential image points and this mean value is used in the signal data stream and then,
   when the brightness values of several sequential image points are not all smaller than the predetermined brightness threshold value, the corresponding multibit word is introduced in unchanged form to conversion in activation sequences; and
c) the first and second step is performed for each sequential image point; and
d) wherein the number of image points to be checked in the first step is at least three.

2. Method according to claim 1,
   wherein in the second step, when the brightness values of several sequential image points are all smaller than the predetermined brightness threshold value, a weighted mean value formation of the brightness values of several sequential image points is performed.

3. A device for noise reduction in a pulse-width-controlled image-display device, in which a time interval available for representing an image is divided into sequential weighted partial time intervals and the brightness signals that form a signal data stream, that belong to the image points of the image to be represented, and are in the form of multibit words, are produced by conversion into activation sequences assigned to the partial time intervals, the device comprising:
   an input connection (E) for receiving the signal data stream corresponding to the brightness signals,
   a test unit (1) for checking if the brightness values of several sequential image points is smaller than the predetermined brightness threshold value, and
   a switch (4) controlled by the test unit, which, on the output side, when the brightness values of several sequential image points are all not smaller than the predetermined brightness threshold value, provides the time-delayed signal data stream in the unchanged form and when the brightness values of at least three sequential image points are all smaller than the predetermined brightness threshold value, provides a signal data stream filtered in the sense of a mean value formation.

* * * * *